United States Patent [19]
Leikam

[11] Patent Number: 5,269,928
[45] Date of Patent: Dec. 14, 1993

[54] CLARIFIER TANKS

[75] Inventor: Werner H. Leikam, Walluf, Fed. Rep. of Germany

[73] Assignee: Dorr-Oliver Incorporated, Milford, Conn.

[21] Appl. No.: 993,287

[22] Filed: Dec. 18, 1992

[30] Foreign Application Priority Data

Feb. 20, 1992 [EP] European Pat. Off. ........ 92102808.0

[51] Int. Cl.⁵ ............................................. B01D 21/06
[52] U.S. Cl. ................................ 210/525; 210/528; 210/530
[58] Field of Search ............... 210/519, 523, 525, 528, 210/529, 530

[56] References Cited

U.S. PATENT DOCUMENTS

| | | | |
|---|---|---|---|
| 2,681,151 | 6/1954 | Coulter | 210/525 |
| 2,780,361 | 2/1957 | Evans et al. | 210/525 |
| 3,327,867 | 6/1967 | Hikeo | 210/528 |
| 3,338,419 | 8/1967 | Smith | 210/525 |
| 3,627,132 | 12/1971 | Kelly | 210/525 |
| 4,594,136 | 6/1986 | Grujanoc et al. | 210/528 |
| 4,830,748 | 5/1989 | Hall | 210/525 |
| 5,200,079 | 4/1993 | Schwartz et al. | 210/525 |

FOREIGN PATENT DOCUMENTS 550378 1/1943 United Kingdom .

*Primary Examiner*—Christopher Upton
*Attorney, Agent, or Firm*—Harold M. Snyder

[57] ABSTRACT

A clarifier tank having a center column is provided with a center-driven bottom rake mechanism for settled sludge removal, a rotating scum rake mechanism comprised of pipes with longitudinal openings for scum removal via the center column, the rake mechanisms rotating in the same or opposite directions at different speeds, and submerged effluent pipes projecting from the sidewall of the tank toward the center of the tank to drain the clarified sewage into an effluent launder exterior of the tank.

13 Claims, 4 Drawing Sheets

CLARIFIER TANKS

FIELD OF THE INVENTION

The invention is directed to clarifier tanks with cooperating rake structures for improved removal of scum and settled sludge.

BACKGROUND OF THE INVENTION

There are many different kinds of clarifier tanks for the treatment of unclarified sewage. Many round clarifier tanks have a center column made of concrete, with a center-driven mechanism, rotatable around the column, in the shape of a cage, to which a multiarmed bottom rake mechanism is attached. Rake blades are attached to the arms which are arranged within a certain distance from the bottom. These rake blades move the sludge, which settles at the bottom, to an area were it can be removed from the tank.

Because a part of the biomass in the clarifier tank does not settle at the bottom but rises to the water surface, many clarifier tanks have to be equipped with mechanisms to remove this scum. Known are rake mechanisms with scum rake blades, scum boxes and overflow weirs. Also known are so called skimmers to remove scum from the water surface. These are comprised of pipes with an opening on the side, through which the scum enters the pipe and is drained. It is also standard practice for the waste water inlet pipe to run underneath the tank into the column.

An opening on the side of the column allows the unclarified sewage to enter the clarifier tank.

According to new guidelines, clarifier tanks have to take on additional functions, such as e.g. the removal of phosphates, nitrification and denitrification. According to current guidelines, the total contents of solids in the drain of the secondary clarifier tank should be limited to 20 mg/l.

To satisfy these requirements, it proved to be practical to replace the usual overflow weirs used in common clarifier tanks with submerged effluent pipes projecting from the sidewall of the clarifier tank towards the center of the tank, with openings to drain the clarified sewage from the tank through the sidewall into a effluent circumferential launder surrounding the clarifier tank. By using these submerged effluent pipes, the clarified sewage is removed below the water surface on which the scum accumulates, and is drained out of the system into the effluent launder surrounding the tank.

In addition, the scum removal output of newer clarifier tanks should be increased and the scum be removed quickly, easily and as completely as possible, even if it is of a light creamy consistency.

SUMMARY OF THE INVENTION

The invention is directed to a clarifier tank for the treatment of unclarified sewage which allows various functions and improves the effectiveness with regard to the removal of the scum and sludge.

Clarifier tanks according to the invention are provided with submerged effluent pipes projecting from the sidewall of the clarifier tank towards the center of the tank, a center column through which unclarified sewage is piped-in from the bottom up into the clarifier tank, a center-driven device which can rotate around the column with a multiarm bottom rake mechanism and a scum rake mechanism separated therefrom characterized in that both rake mechanism are capable of rotating in the same or opposite direction at different speeds, the scum rake mechanism, which is supported by and able to rotate around the center column, is center or traction driven and the scum rake mechanism has a scum pipe leading to a scum drain protruding from the column.

With the mechanisms according to the invention in the clarifier tank, it is possible to have the submerged effluent pipes project far into the tank, resulting in a better quality of drainage without inhibiting the effectiveness of the sludge or scum removal. The submerged effluent pipes can, in some cases, project as far as the center of the tank. Usually, the submerged effluent pipes are placed at regular intervals along the inner sidewall of the clarifier tank. For example, submerged effluent pipes are attached to the inner sidewalls of the clarifier tank which than lead through the sidewall into the effluent circumferential launder surrounding the tank.

The separated drive of both rake mechanisms, of which the bottom rake mechanism is always center-driven and the scum rake mechanism is either traction—or center driven, results in a simple, strong and versatile construction of the rake mechanisms so that, with simple means, both mechanisms can be rotated in the same or opposite direction at different speeds and therefore can be individually set to the required rake capacity at the bottom or surface and with the help of scum rake blades can precompress scum of a light, creamy consistency to make its removal more effective.

The removal of the scum through the center column of the clarifier tank simplifies the operation and construction of the system.

DESCRIPTION OF THE DRAWINGS

The drawings will explain the invention in further detail.

DETAILED DESCRIPTION OF THE INVENTION

Figure 1:
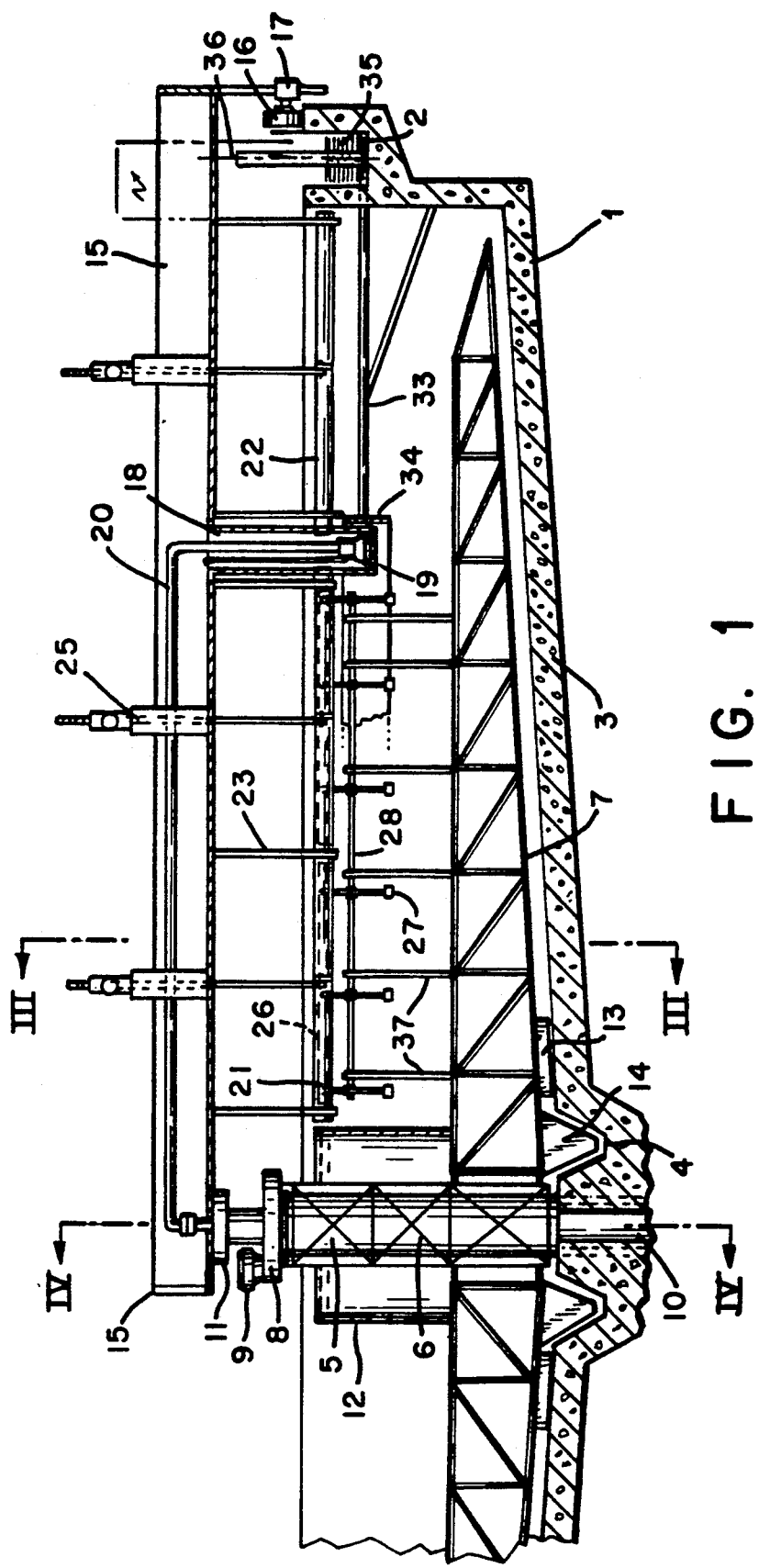
FIG. 1: a vertical cut through a clarifier tank according to the invention, in which the left part is cut away.

As already explained, in a preferred embodiment the drain pipes with openings for the entry of the clarified sewage drain into an effluent circumferential launder surrounding a round clarifier tank. It is to an advantage to keep this effluent circumferential launder free of biological material by attaching a cleansing brush to the scum rake mechanism. At least one or more cleansing brushes should be attached to the scum rake mechanism circulating in the effluent circumferential launder. To obtain an extra cleaning result from the cleansing brushes, said brushes can, along with rotating in the effluent circumferential launder, be turned perpendicularly to keep the sidewalls and bottom of the effluent launder free from biological material.

Biological material could stick to the openings of the drainage pipes, eventually clog them and block the flow of clarified sewage to the effluent launder circumferential. The openings of the drainage pipes should be kept free of biological material by using an additional cleaning device which can be rags or brushes which are attached to the rotating scum rake mechanism and during the rotation drag over the openings of the stationary effluent pipes and wipe off any biological material stuck to the openings.

The scum rake mechanism can be constructed in different ways, e.g. scum rake blades attached to a bridge are used for removal of small amounts of a relatively compact scum. Preferably, the scum rake mechanism should consist of a rotating bridge with attached skimmers, which are suitable for an effective removal of scum of various consistencies, even of a light, creamy consistency. These skimmers are comprised of pipes with longitudinal openings allowing the scum to enter. The scum will run through the pipes into a collecting tank and is then removed from the system.

The skimmers can be turned around their longitudinal axis to change the immersion depth of the inlet opening or, if necessary turned so they are positioned above the water surface to prevent the entry of clarified sewage if no scum removal is necessary, or turned so the inlet opening is further below the water surface to adjust the inlet opening to the thickness of the scum.

A scum collecting tank containing a sump pump is attached to the rotating bridge of the scum rake mechanism. The scum runs from the skimmers into the scum collecting tank, is than pumped via a scum pipe to a scum drain which enters the center column at the top, leads downward and than exits underneath the clarifier tank.

Scum of a light, creamy consistency enters the skimmers of the scum rake mechanism incompletely or only with difficulty. For this reason it is preferred to compress the scum using a simple method or rather force the scum into the skimmers. The clarifier tank according to the invention provides scum rake blades for this purpose. The normal position of the scum rake blades are in the same height as the skimmers. When the skimmers, which are attached to the rotating scum rake mechanism, are moved closer to the scum rake blades, the scum between the scum rake blades and the skimmer is compressed and forced into the skimmers. The scum rake blades are mounted to swivel around on an axle so that the skimmers, when passing over the scum rake blades, will press them down allowing the skimmers to move on along its circuit. After the skimmer passes over the scum rake blades, they return to their previous position at the height of the skimmer. The scum rake blades are to be attached to one end of lever arms swiveling around an axis, whereby a counterweight is attached to the other end of each lever arm, so that the scum rake blades are forced back to their normal position after the skimmer has passed.

The scum rake blades between the center column and the submerged effluent pipes are attached to the bottom rake mechanism and rotate through the clarifier tank. Since according to the invention, the bottom rake mechanism and the scum rake mechanism are rotating in either the same or opposite direction at different speeds, there will be times when the scum rake mechanism will pass over the bottom rake mechanism which will bring the scum rake blades close to the skimmers. Eventually, the skimmers will press the scum rake blades down and pass over them.

This construction and process are not possible in the area where the submerged effluent pipes are positioned. Here, the scum rake blades are attached permanently to the sidewall of the tank, but still are constructed to be pressed down by the rotating skimmers to allow the skimmers to pass over.

The center-driven bottom rake mechanism can be constructed in the usual manner and should preferably have two, four or six arms, extending over the ground parallel to the mechanism. Attached to the support structure of the bottom rake arm are rake blades which can have another rubber strip attached to their lower free edge to completely remove the biomass from the bottom of the tank without damaging the rake blade or the bottom of the tank.

The bottom of the tank should have a downward inclination from the edge toward the center column to move the sludge towards the center. The arms cam be set at an angle to the radius of the tank to aid the downward flow of the sludge towards the center.

The center column should be surrounded by a V-shaped collecting channel containing a drain pipe so that the sludge, which was forced from the bottom of the tank into the collecting channel can be removed through this drain pipe. By having least one V-shaped scraper positioned in the collecting channel, the sludge will be forced preferably towards the drain pipe easing the removal from the sludge collecting channel.

The center column of the clarifier tank according to the invention, contains a unclarified sewage inlet pipe, which passes underneath the clarifier tank and is connected to the bottom of the column. Positioned below the water surface are openings between the inlet pipe and the tank content, so that the unclarified sewage flows continuously from the columns inlet pipe into the tank. The inlet openings should be surrounded by an inlet cylinder to distribute the incoming unclarified sewage evenly. The inlet cylinder is opened at the bottom so that the incoming sewage moves toward the ground and blends in with the sewage in the tank.

The column itself is permanently-attached to the ground but is surrounded by a rotating mechanism, preferably of a cage-like structure, to which the arms of the bottom rake mechanism are connected. This mechanism and the bottom rake mechanism, driven by a geared motor mounted on top or on the side of the column above the water surface are placed in a rotating motion via a differential. A pipe-like support, leading through the opening in the middle of the center-drive, for the scum rake mechanism, should be located in the center on the top surface of the center column. The free end of the scum rake mechanism rests on this center support if it extends over only one radius of the clarifier tank; the center part of the scum rake mechanism rests on this center support if the scum rake mechanism extends over the diameter of the clarifier tank. This serves as a support for the non-powered side of the scum rake mechanism.

Besides the sewage inlet pipe, the center column contains the scum drain which is connected to the scum pipe. The scum drain leads downward and removes the scum from system. The center column should contain supply lines, such as power and/or clean water needed in the upper part of the system, necessary to operate the system to rinse parts of the system.

Depending on the length of the submerged effluent pipes whose free ends project far into the tank, it could be necessary to attach a annular baffle joining the ends of the submerged effluent pipes to improve their stability. In a round clarifier tank this baffle is attached concentric with the sidewall at a distance from the center column.

Figure 2:
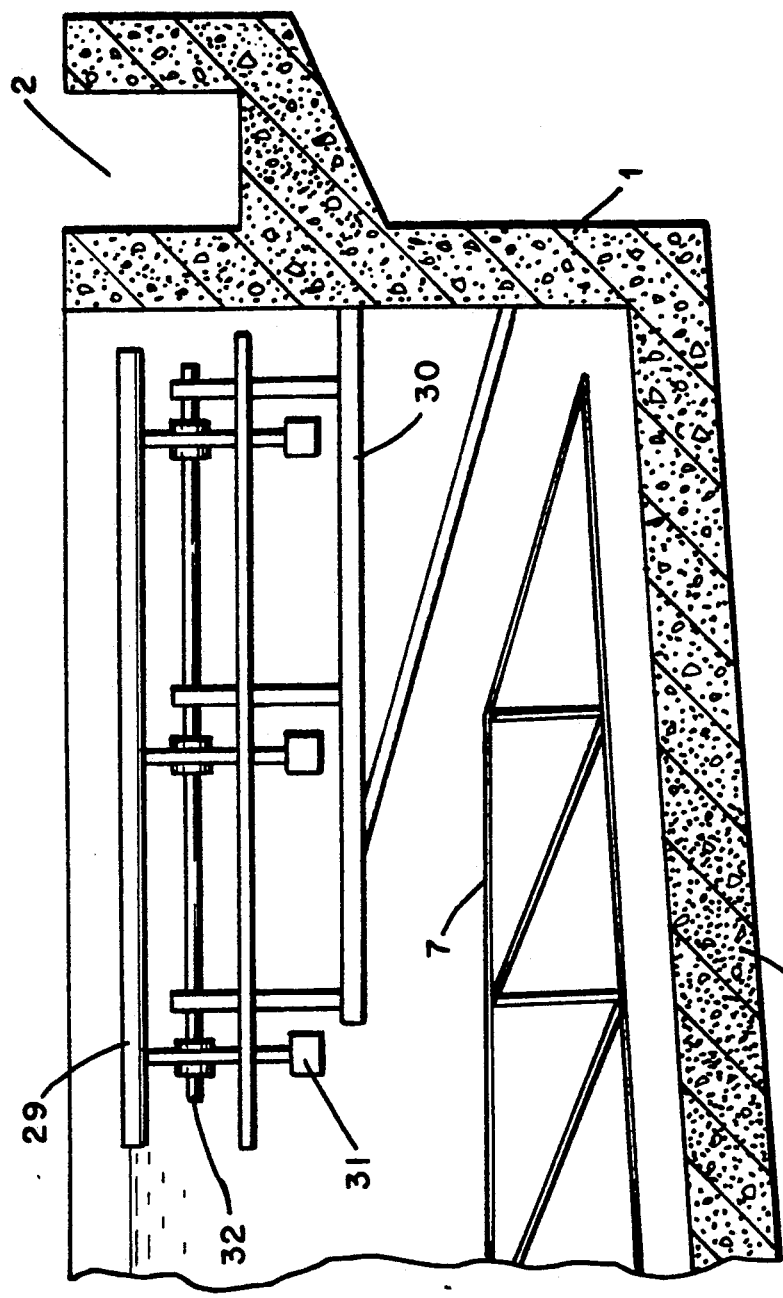
FIG. 2: an enlarged detail of the rotation section of the clarifier tank as show in FIG. 1, with the remainder cut away.

The clarifier tank 1 shown in FIGS. 1 and 2 has a surrounding effluent circumferential launder 2 and a floor 3 with downward inclination towards the center, where a V-shaped sludge collecting channel 4 is located. The sludge collecting channel 4 surrounds a center column 5 which is permanently attached to the floor.

The column 5 is surrounded by a rotatable cage-like structure 6, to which the arms of the bottom rake mechanism 7 are attached. The cage-like structure with the attached bottom rake mechanism arms is rotated around the axis of column 5 by means of a center-drive 8 with a gear motor 9. The column 5 has an inlet pipe 10, coming into the column 5 from below, and a support 11 located on top of the column 5 for the non-powered turning part of the scum rake mechanism. The column 5 is surrounded with an inlet cylinder 12. Further details of the column are better shown in FIG. 4.

Rake blades 13 are attached close to the floor on the bottom rake mechanism 7, only one of which is shown in FIG. 1 and completely left off in FIG. 2, for reasons of simplicity. Further, scrapers 14 are attached to the bottom rake mechanism, which move through the sludge collecting channel 4.

Figure 4:
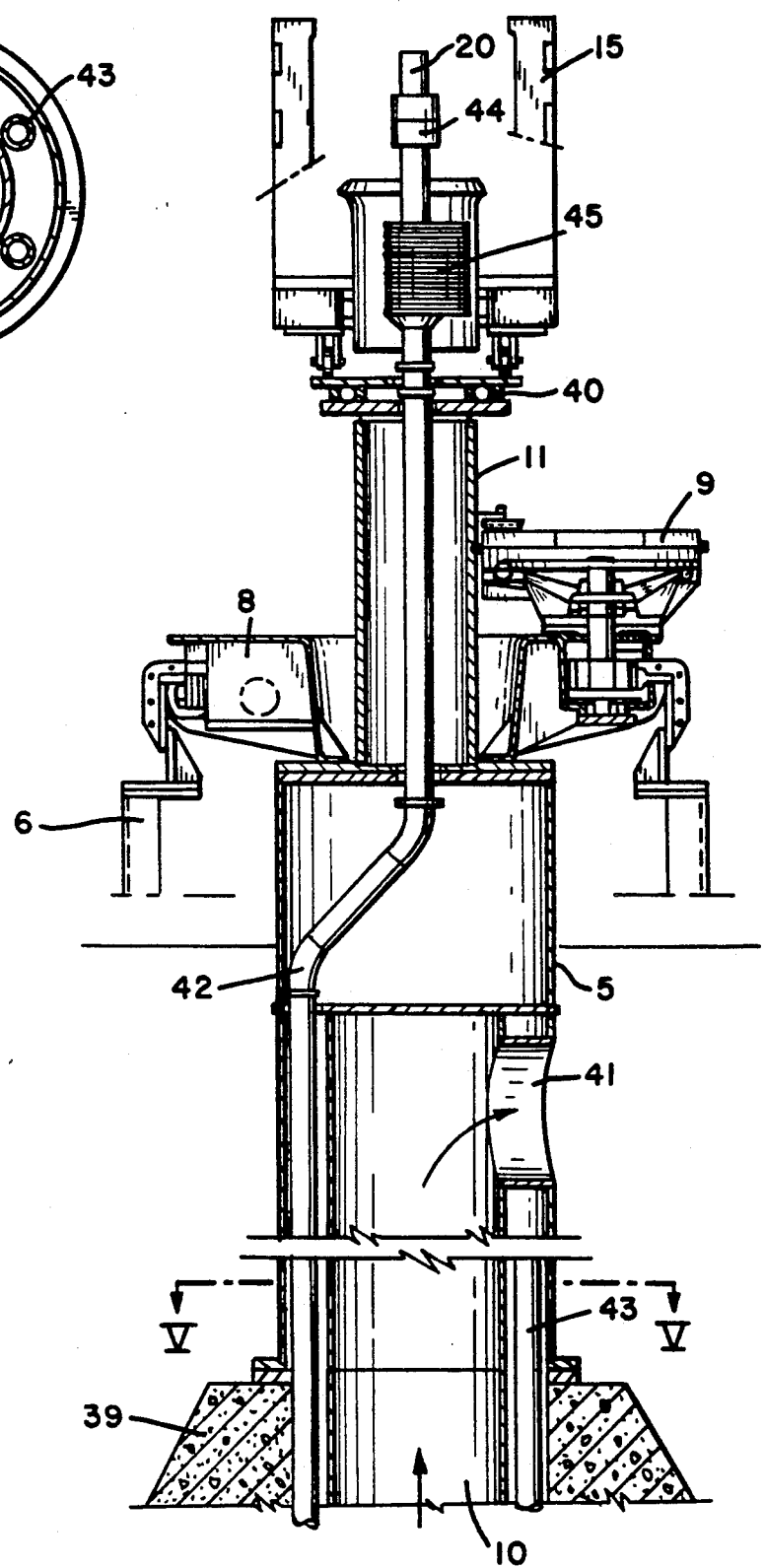
FIG. 4: a vertical cut along line IV—IV in FIG. 1.

The tractor-driven scum rake mechanism has a rotatable bridge 15 which is supported on one end by support 11 on column 5 and on the other end, the outer end, has a rolling device 16 powered by a motor 17. The bridge 15 can also be center-driven. A sump pump 18 with scum collecting tank 19 is attached to the rotatable bridge 15. The pump 18 is connected to a scum pipe 20, which leads to a scum drain located within column 5, which is shown in FIG. 4.

The inner skimmer 21 is attached to the bridge and placed between the column 5 and scum collecting tank 19. The outer skimmer 22 is placed between the scum collecting tank 19 and the sidewall of the clarifier tank 1. Both skimmers are attached to the bridge 15 with vertical suspensions 23 and have longitudinal inlet openings, which can be seen clearly in FIG. 3. The immersion depth of the inlet openings can be changed by means of a regulating gear 25. The skimmers draining into the scum collecting tank 19 will bring the scum from the water surface to the scum collecting tank.

Scum rake blades 26, which are attached to the bottom rake mechanism 7, are assigned to the inner skimmer 21. Counterweights 27 will hold the blades in their normal position. The scum rake blades are mounted on an axle 28 so that the skimmer 21, passing over the scum rake blades 26, will press the scum rake blades 26 down, as shown in both positions in FIG. 3.

Figure 3:
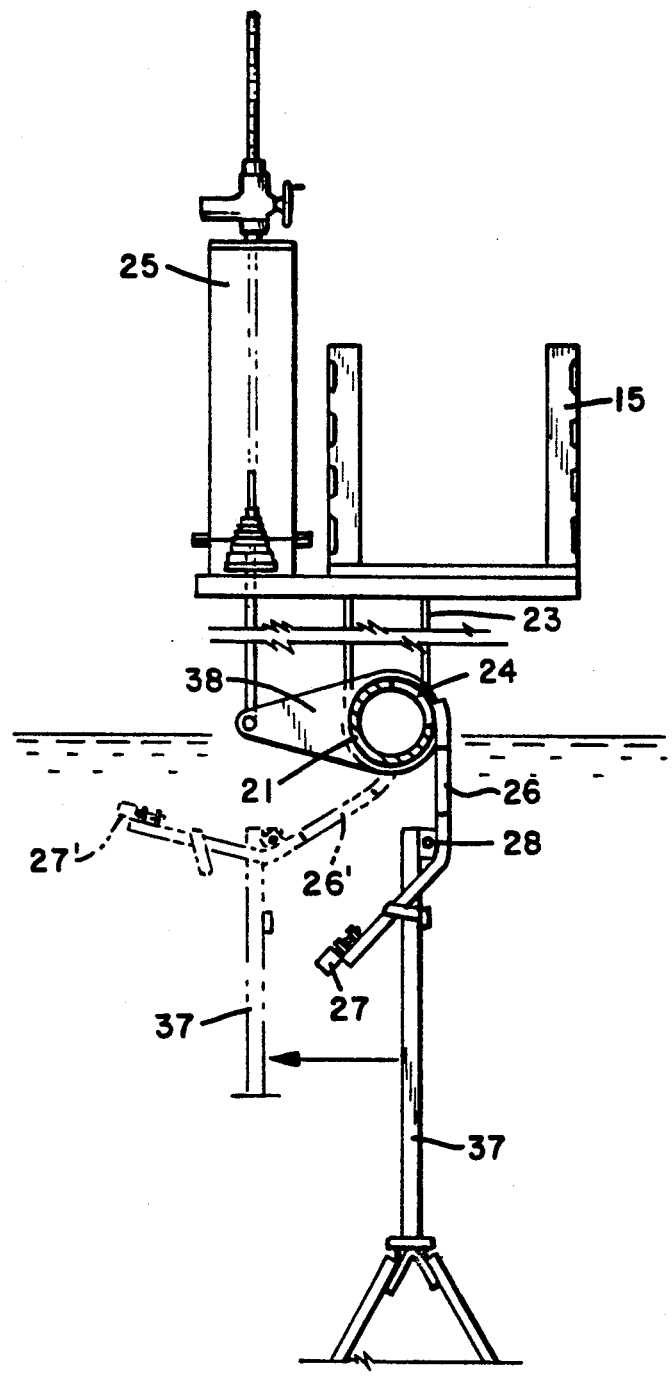
FIG. 3: a cut along line III—III in FIG. 1, viewed from the right side, without the bottom rake mechanism and the tank itself.

The stationary scum rake blades 29 are assigned to the skimmer 22 as shown in FIG. 2, but left off in FIG. 1, for reasons of clarity. The scum rake blades 29 are mounted on a mounting structure 30 which is permanently attached to the sidewall of the clarifier tank and has, just like the scum rake blades 26, counterweights 31 which will hold the blades in their normal position. The skimmer 22, passing over the scum rake blades 29 during their rotation, will turn them around the axle 32 and will press the scum rake blades 29 down, as shown in FIG. 3.

The scum rake blade 29 is attached permanently to the sidewall and not to the rotating bottom rake mechanism, because the submerged effluent pipes 33 are also attached to the sidewall, as shown in FIG. 1. The submerged effluent pipes 33 are pipes with openings, the inner end closed and attached to an annular baffle 34, the outer end protruding through the sidewall of the clarifier tank 1 opening into the effluent circumferential launder 2.

At least one cleansing brush 35 should be attached to the bridge 15 and circulate in the effluent circumferential launder 2, preferably rotating about its vertical axis 36.

As mentioned above, FIG. 3 shows the movement of the scum rake blades 26 and 29 when they are pressed down by the skimmers 21 and respectively 22. The scum rake blade is shown here in two positions: the right position shows the normal position before the skimmer 21 passes over the blade, the left, dotted, position shows the depressed position while the skimmer 21 passes over the blade.

As shown in FIG. 3, the skimmer 21 is a pipe with a longitudinal inlet opening 24, attached to the bridge 15 with vertical suspension 23. The immersion depth of the inlet opening 24 is adjustable via a wing member 38 and a regulating gear 25.

The scum rake blades 26 are attached to the bottom rake mechanism 7 (not shown in FIG. 3) with an extension pole 37. A counterweight 27 keeps the scum rake blade in its upright position, which is the same height as that of the skimmer 21, as shown on the right. When the skimmer passes over the scum rake blades during the rotation of the bridge 15) it will press the scum rake blades down, as shown in FIG. 3 in the left dotted drawing, reference mark 26. The scum rake blades rotate around an axle 28. The counterweight 27 is lifted but it will force the scum rake blades back into their normal position after the skimmer 21 passed over, as show on the right. Reference mark 37 shows the extension pole on the left side.

Figure 5:
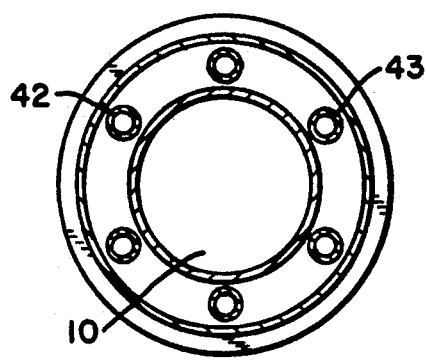
FIG. 5: a cut along line V—V in FIG. 4.

FIGS. 4 and 5 explain the construction of the center column 5. The lower part of the drawing is cut away. For purposes of clarity, as well as to show the supply lines and openings, the column was turned 30°.

The column 5 is permanently attached to the tank bottom 39. The center-drive 8 together with gear motor 9 and the cage-like structure 6 is located on top of the column. The cage-like structure 6 is only partly shown and can be rotated around the column 5 with the help of the center-drive 8.

The support 11 has the shape of a pipe, protruding through the center of the center-drive 8. The rotatable bridge 15 rests via a ball joint 40 on support 11.

The unclarified sewage is piped underneath the clarifier tank into the column 5 via the feeder line 10 and enters the clarifier tank through the inlet openings 41. The scum is pumped from the scum collecting tank 19, shown in FIG. 1, through the scum pipe 20 into the scum drain 42 which protrudes through the column 5. Five supply lines 43 for power, clean water and such are located in the column 5. If necessary, one of the supply lines 43 can be replaced with another scum drain.

A swivel joint 44 is located in bridge 15 between the scum pipe 20 and scum drain 42. The usual electrical slip ring devices 45 are shown in the area of bridge 15.

During operation of the apparatus shown in the drawing, the sludge which settles on the bottom of the clarifier tank 1 is removed with the bottom rake mechanism 7 and attached blades 13. The sludge is moved into the collecting channel 4 and finally removed through a pipe (not shown). The scum rake blades 26 and 29 will press the scum near the water surface into skimmers 21 and 22. The scum is collected in the scum collecting tank 19 and pumped through the scum pipe 20 and the scum drain 42 out of the clarifier tank. The effluent is drained through the submerged effluent pipes 33 into the effluent circumferential launder 2 and is finally removed from the system through a pipe (not shown).

The bridge 15 with the attached scum rake mechanism and the bottom rake mechanism rotate in the same or opposite directions and at different speeds, so that periodically the skimmers will pass over the scum rake blades.

I claim:

1. In a clarifier tank comprising submerged effluent pipes projecting from the side wall into the interior of the tank, a center column through which unclarified sewage is introduced into the clarifier tank from below, a device arranged rotatable around the column, centrally driven and having a multiarm bottom rake mechanism and a scum rake mechanism separated therefrom, the improvement comprising means for driving the two rake mechanisms either counter-currently or concurrently with different velocities, the scum rake mechanism having a traction or center drive that is supported rotatably by the center column and the scum rake mechanism comprising at least one scum skimmer pipe connected to a collecting tank having a sump pump connected to a scum withdrawal pipe connected to a scum drain in the column by a swivel joint.

2. Clarifier tank according to claim 1, wherein the submerged effluent pipes open into an effluent circumferential launder at the periphery of the clarifier tank in which launder at least one launder cleansing brush fixed to the scum rake mechanism and rotating with it is mounted.

3. Clarifier tank according to claim 2, wherein the launder cleansing brushes are rotatable around a substantially vertical axis additionally to the circumferential movement thereof.

4. Clarifier tank according to claim 3, wherein scum rake blades are mounted which extending to the level of the skimmer pipes are connected to the bottom rake mechanism by pivot means so that the blades are depressed by the skimmer pipes when they cross the skimmer revolution route.

5. Clarifier tank of claim 4, wherein in the region of the effluent pipes scum rake blades extending to the level of the skimmer pipes are mounted to a stationary support by pivot means so that they are depressed by contact with a skimmer.

6. Clarifier tank according to claim 5, wherein the center column contains additional supply pipes.

7. Clarifier tank according to claim 6, wherein the center column is surrounded by collecting launder having a substantially V-shaped cross-section and an effluent pipe.

8. Clarifier tank according to claim 7, wherein within the sludge collecting launder at least one center scraper is arranged.

9. Clarifier tank according to claim 8, wherein the center column is surrounded by an influent well.

10. Clarifier tank according to claim 9, wherein the center column is surrounded rotatably by a cage structure driven by a centrally arranged gear having a gear motor, to which the arms of the bottom rake mechanism are mounted.

11. Clarifier tank according to claim 10, wherein the bottom rake mechanism comprises two, four or six arms.

12. Clarifier tank according to claim 11, wherein the pivot means comprises lever arms pivotable around an axis, the blades being mounted to one end of each lever arm, and at the other end of each lever arm a weight being mounted which presses the scum rake blades to the level of the skimmer pipes.

13. Clarifier tank according to claim 12, wherein the effluent pipes are mounted radially with the free ends thereof projecting into the interior of the tank and connected to an annular baffle.

* * * * *

UNITED STATES PATENT AND TRADEMARK OFFICE
CERTIFICATE OF CORRECTION

PATENT NO. : 5,269,928

DATED : December 14, 1993

INVENTOR(S) : W. H. Leikam

It is certified that error appears in the above-identified patent and that said Letters Patent is hereby corrected as shown below:

Column 4, line 16, change "cam" to -- can --.

Column 4, line 23, after "having", insert -- at --.

Column 8:

Claim 7, line 2, after "surrounded by", insert -- a sludge --.

Signed and Sealed this

Seventh Day of June, 1994

*Attest:*

BRUCE LEHMAN

*Attesting Officer*  *Commissioner of Patents and Trademarks*